United States Patent [19]

Locher

[11] Patent Number: 4,480,497
[45] Date of Patent: Nov. 6, 1984

[54] BALL LOCKING MECHANISM

[75] Inventor: Hermann Locher, Dornach, Switzerland

[73] Assignee: Giroflex Entwicklungs AG, Koblenz, Switzerland

[21] Appl. No.: 332,718

[22] Filed: Dec. 21, 1981

Related U.S. Application Data

[63] Continuation of Ser. No. 054,565, Jul. 2, 1979, abandoned.

[30] Foreign Application Priority Data

Jul. 13, 1978 [CH] Switzerland .................. 7626/78

[51] Int. Cl.³ .................. G05G 5/06; F16B 7/14
[52] U.S. Cl. .................. 74/531; 403/328; 403/108; 403/DIG. 6
[58] Field of Search .................. 74/527, 531; 70/39; 285/302; 251/297; 403/328, 316, 317, 108, DIG. 6; 24/211 N

[56] References Cited

U.S. PATENT DOCUMENTS

| | | | |
|---|---|---|---|
| 2,528,002 | 10/1950 | Katzberg | 74/531 X |
| 2,963,930 | 12/1960 | Clothier et al. | 285/303 X |
| 3,276,799 | 10/1966 | Moore et al. | 403/316 |
| 3,351,363 | 11/1967 | Downey et al. | 285/303 |
| 3,430,305 | 3/1969 | Geffner | 24/211 N |
| 3,491,663 | 1/1970 | Morgan | 74/527 X |
| 3,800,617 | 4/1974 | Dornan | 74/527 X |
| 3,826,156 | 7/1974 | Dornaus | 74/527 |
| 4,032,240 | 6/1977 | Reinhardt et al. | 403/108 |

FOREIGN PATENT DOCUMENTS 910662 11/1962 United Kingdom .................. 403/108

Primary Examiner—Kenneth Dorner
Attorney, Agent, or Firm—Werner W. Kleeman

[57] ABSTRACT

A ball locking mechanism for the releasable locking of a movable part comprises a locking or arresting ball arranged in at least one bore of a stationary or fixed part or component and can be pushed, by means of a slide member, into one of a number of bores of the movable part or element, so that such movable part can be locked in place. For unlocking, the slide member is displaced until a bore thereof comes to lie essentially coaxially with respect to the remaining bores. Then, the ball moves out of the aforementioned one bore of the movable part. The movable part can then be displaced until a further similar bore thereof comes to lie essentially coaxially with respect to the bore of the fixed part. By means of the pressure of a spring, exerted upon the slide member, the ball then is again pushed into this further bore.

7 Claims, 2 Drawing Figures

BALL LOCKING MECHANISM

CROSS REFERENCE TO RELATED APPLICATION

This application is a continuation application of my commonly assigned, copending U.S. application Ser. No. 06/054,565, filed July 2, 1979, now abandoned.

BACKGROUND OF THE INVENTION

The present invention relates to a new and improved construction of a ball locking mechanism for the releasable locking of a first movable part or component with a second part or component within which the first part is guided. The first movable part has at least one bore into which partially protrudes, in the locked position of the first part at the second part, a locking ball or sphere which is partially mounted in a bore provided at the second part or component.

Ball locking or latching mechanisms are well known in numerous fields of application. They permit retention of the object or element which is to be locked in place, for instance a door or closure cover for, by way of example, a cabinet shelf in the locked or latched position, wherein, however, without the application of any considerable force, and especially, without the need to use keys or even possibly appropriate tools, opening of the locked object is possible. There is also known to the art, for instance the use of such locking mechanisms at objects wherein telescopically coacting tubes can be arrested in their extended position, such as for instance at the legs of camera tripods or the like.

Such ball locking mechanisms usually work on a spring principle, i.e., the locking or latching ball is spring-loaded in some manner. The spring, urging the ball into the coacting opening or bore provided for receiving such ball, can either be constituted by an elastic plate or a helical or spiral spring.

SUMMARY OF THE INVENTION

It is a primary object of the present invention to provide a new and improved construction of a ball locking mechanism which effectively serves to interlock two relatively movable parts or components in place, while affording easy release of such interlocking action when necessary.

Another and more specific object of the present invention aims at providing a new and improved construction of a ball locking mechanism structured so that, without the need to use a spring, there can be exerted a direct application of force upon the locking ball.

In keeping with the immediately preceding object it is a further object of the invention to design a ball locking mechanism of the character described, which eliminates the use of a spring for the direct application of force to the arresting ball, and thus, beneficially eliminates the need for an element which is prone to malfunction or disturbance and tends to weaken by virtue of the continuous use thereof.

Still a further significant object of the present invention aims at providing a new and improved construction of a ball locking mechanism which is relatively simple in design, economical to manufacture, easy to use, reliable in operation, and provides for positive locking of two relatively movable components in desired position, while affording easy unlocking thereof, when necessary, through the use of quite simple manipulations and actuation of the ball locking mechanism.

Now in order to implement these and still further objects of the invention, which will become more readily apparent as the description proceeds, the ball locking mechanism of the previously mentioned type and constructed according to the invention, is manifested by the features that the second part or component is provided with a slide member which covers the bore of the second part at the end situated opposite the bore of the first part. The slide member has means, for instance a recess or bore, into which there can partially move, during the displacement of the slide member, the ball for the purpose of unlocking the first part when there is exerted a pressure upon the arresting ball which extends transversely with respect to the lengthwise axis of the bore of the second part.

BRIEF DESCRIPTION OF THE DRAWINGS

The invention will be better understood and objects other than those set forth above, will become apparent when consideration is given to the following detailed description thereof. Such description makes reference to the annexed drawings wherein FIG. 1 schematically shows an exemplary embodiment of ball locking mechanism according to the invention, and specifically, by way of example, used in conjunction with an elevationally adjustable backrest of a chair or easy-chair or the like, there being shown a horizontal cross-sectional view through the backrest and the ball locking mechanism, FIG. 2 schematically shows a vertical section of an alternate embodiment of the arrangement according to FIG. 1.

DETAILED DESCRIPTION OF THE PREFERRED EMBODIMENT

Figure 1:
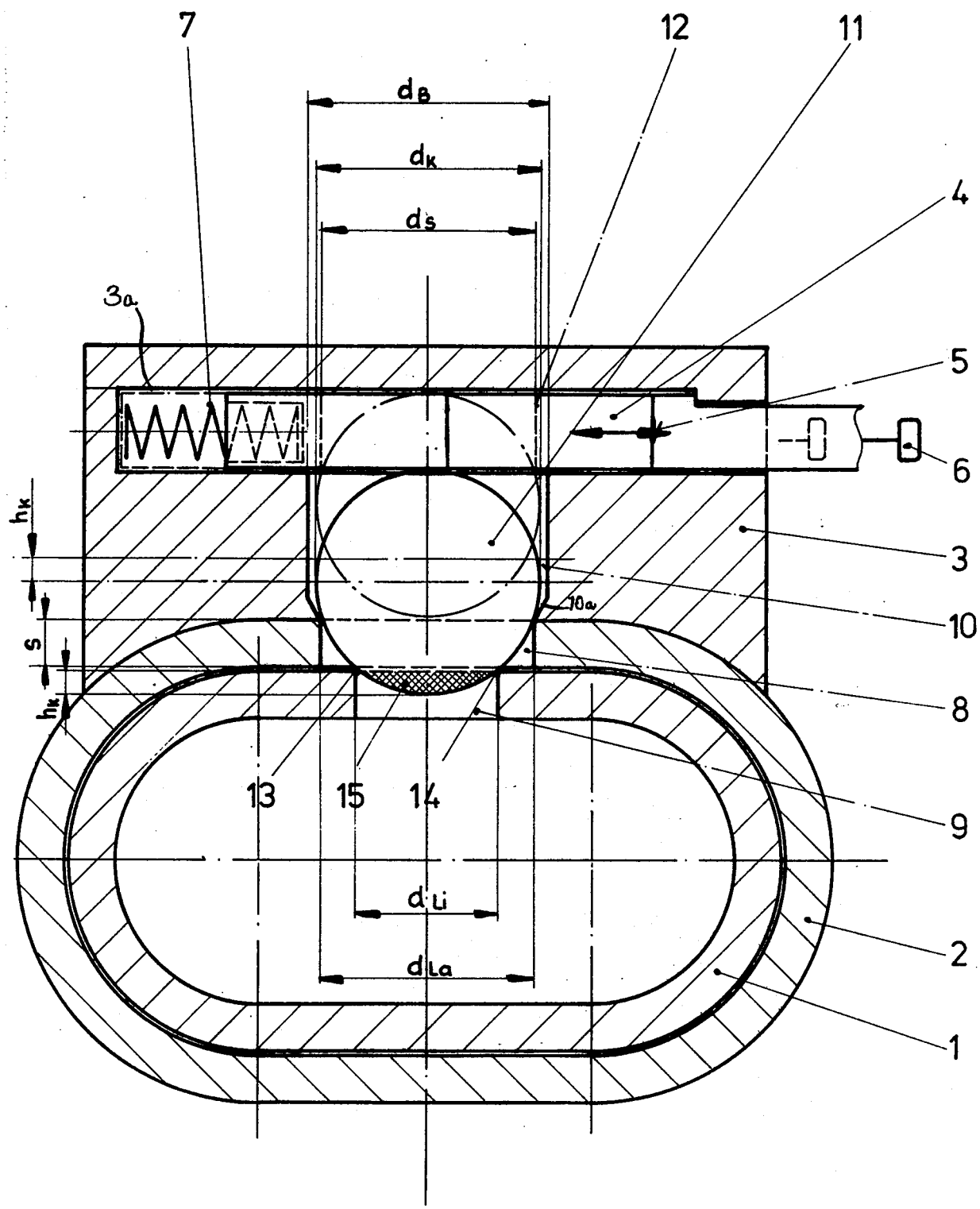

Describing now the drawings, it is to be understood that only enough of the relatively movable parts have been shown, assumed to be used in conjunction with a chair or similar piece of equipment, as will be necessary for those skilled in the art to readily understand the underlying principles and concepts of the present development. Turning attention now to the figures of the drawings, reference numeral 1 designates the movable part or component of a backrest, shown for instance in the form of a tube of substantially oval or elliptical cross-sectional configuration. The movable part or component 1 slides telescopically within a second tube 2 of likewise oval or elliptical cross-sectional configuration. The internal diameter of the second tube 2 is coordinated to the external diameter of the movable tube 1, such that the latter can be vertically shifted, free of play, within the second tube 2, which is here assumed to be stationary in the described environment of use. The first tube 1 carries, at its upper end, any suitable and therefore not particularly shown backrest of the chair or the like. The tube 2 or equivalent element is connected with an arm or bracket 3 which is attached to the likewise not particularly shown seating surface or seat or with the so-called upright standing tube of the chair. Thus, the first movable tube 1 may be considered as constituting a first movable part, whereas the second tube 2 together with the arm or bracket 3 or equivalent structure may be considered as constituting a second part or means at which there is guided said first movable part. Operatively connected with the arm 3 is a slide member or slide 4 which can be mounted at the arm or bracket 3 so as to slide transversely thereat, as indicated by the double-headed arrow 5. The slide member 4 can be secured, for instance, by means of straps or brackets at the arm 3 or can be located in a recess or channel thereof, as generally indicated by reference character 3a. What is of importance is only the fact that the slide member 4 can be moved to-and-fro. Displacement of the slide member 4 back-and-forth within the recess or channel 3a can be accomplished by any suitable actuation element, for instance here shown as a push knob 6 by way of example, but of course it is to be expressly understood that also any other suitable actuation element can be equally used. A resilient element or spring 7 can act for instance upon the slide member 4 in such a manner that, when the latter is moved towards the left, the spring 7 is compressed.

The stationary tube 2 or equivalent structure possesses a single essentially circular bore 8 or equivalent structure having a diameter $d_{La}$. On the other hand, the vertically movable inner tube 1 is provided with a plurality of likewise essentially circular bores 9 or equivalent recesses arranged vertically above one another. The arrangement of such circular bores 9 corresponds to the different relative positions of the movable tube 1, and, in the specific exemplary embodiment under discussion serve the purpose of fixing the different possible elevational positions of the backrest mounted in conventional fashion at the tube 1, for instance by bolts or any other suitable fixation means. The bores 9 have a diameter $d_{li}$ which is smaller than the diameter of the single essentially circular bore 8.

Arranged coaxially with respect to the bores 8 and 9 and provided at the arm 3 of the second part 2, 3 is an essentially cylindrical bore 10. This cylindrical bore 10 is constructed such that it slightly conically tapers, as generally indicated by reference character 10a, at the bore end neighboring the bore 8 of the stationary tube 2. This bore 10 serves for the reception of the major part of the arresting or locking ball 11 and at its cylindrical portion has a diameter $d_B$ which is slightly larger than the diameter $d_K$ of the ball or sphere 11, so that such is not hindered in its movement. The length of such bore 10 must be smaller than the aforementioned ball or sphere diameter $d_K$. This length depends upon the field of use, upon the loadability of the ball locking mechanism, and also, in part, upon the construction of the system. Advantageously, the length of such bore 10 amounts to about two-thirds of the ball diameter $d_K$.

Continuing, it is here mentioned that a further bore 12 is provided in the slide member or slide 4. This further bore 12 has been shown conveniently in the drawing by broken lines, i.e., in that position where the entire ball locking mechanism can be unlocked. It is for these reasons that also the actuation element, namely here the exemplary push or pressure knob 6, has been shown in phantom lines to the left of its original position. With this illustration it is intended to indicate that the slide member 4 must be displaced against the force of the spring 7. Normally, the bore 12 is not co-axially arranged with respect to the bores 8, 9 and 10, so that then the cylindrical bore 10 is closed by the slide member 4.

Having now had the benefit of the above description of the exemplary embodiment of ball locking mechanism its mode of operation will now be considered and is as follows:

If the bore 10, as just mentioned, is closed by the slide member 4, then the arresting or locking ball 11 is blocked. On the one hand, such arresting or locking ball 11 can tangentially contact the slide member 4 and, on the other hand, protrudes at its side, diametrically opposite such contact point, partially into one of the bores 9 of the movable tube 1, whereby it contacts the edge of such bore 9. Due to this contact there is precluded any possible displacement of the movable tube 1, since the ball 11 cannot move back, owing to the locking action exerted by the slide member 4. Only when this slide member 4 has been shifted into the unlocking position, is there realized such unlocking possibility by virtue of the now assumed coaxial position of the bores 10 and 12. By exerting pressure or force upon the movable element, the tube 1, acting in this case perpendicular to the plane of the drawing, is there produced a resultant displacement force upon the arresting ball or sphere 11 which moves such out of the bore 9. The tube 1 is now free to be positionally shifted. At the same time there is released the slide member 4, so that the spring 7 strives to push such back into its starting position, and thus, exerts a force upon the arresting or locking ball 11 now partially located in the bore 12 of the slide member 4. This pressure or force displaces the ball 11 back into the next one of the bores 9 which, during the positional shifting of the tube 1, assumes a position which is essentially coaxial with respect to the bore 8 of the stationary or fixed tube 2. Therefore, it will be appreciated that the locking action is accomplished automatically.

The aforementioned pressure, exerted upon the tube 1, which is transmitted also to the ball 11, is not absolutely necessary for displacing the ball 11. It is also in fact possible for the ball 11, when with an inclined or vertical position of the ball locking mechanism the bore 12 is located lower than the remaining bores 8 to 10, to roll out of the bore 9 of the tube 1 under the action of its inherent weight, and therefore to release such tube 1.

Figure 2:
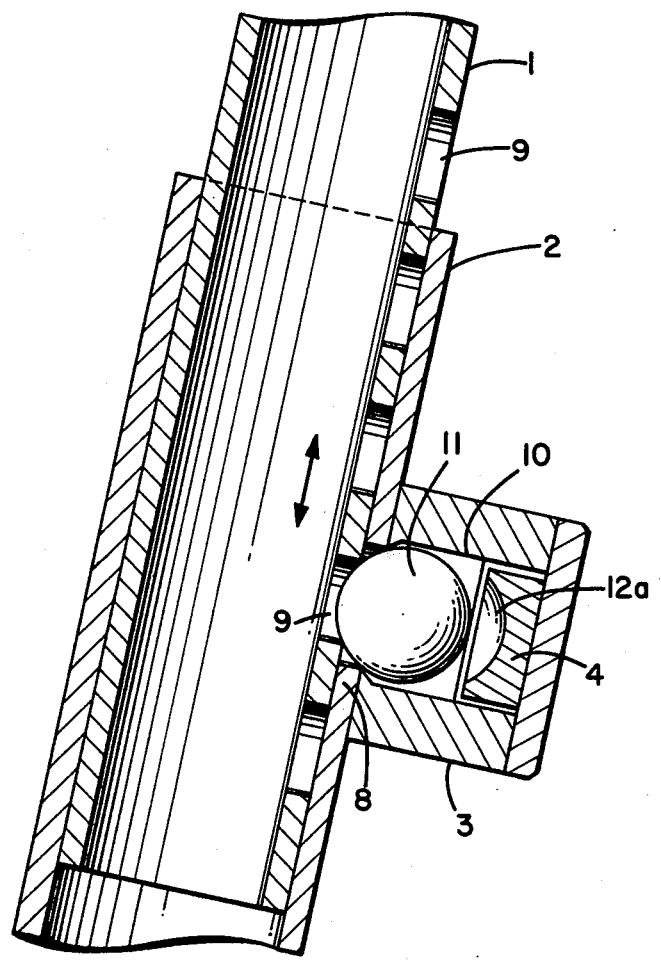

The bore 12 in the slide member 4 has a diameter $d_S$ which must be slightly smaller than the ball diameter $d_K$, so that the ball or sphere 11 can penetrate into such bore 12, but however not pass through such bore. Instead of using such bore 12 it is also sufficient to provide a depression or recess 12a as shown in FIG. 2, which preferably is concave and whose largest depth is equal to the requisite displacement path of the ball 11, the so-called ball stroke $h_K$. Therefore, conceptually the bore 12 also can be considered to be a recess or depression, serving the explained function.

The ball stroke, and more precisely stated, the penetration depth of the ball 11 into the bore 9 of the movable part or component 1, is limited by certain boundaries, so that the ball locking mechanism can function in a faultless manner and also can be appropriately loaded. Thus, the minimum penetration depth amounts to about one-tenth of the ball diameter $d_K$. If this penetration depth is further reduced, then there no longer would be insured for a positive functioning of the ball locking mechanism, since the resultant forces acting upon slide member 4 theoretically could increase to infinity. This would have the result that the bore 9 would be widened or enlarged and the slide member 4 could be bent by the forces acting thereon through the intermediary of the ball 11. On the other hand, the maximum penetration depth amounts to about one-third of the ball diameter $d_K$. If this value is further increased, then, the ball 11 must be displaced by the action of external forces, because the difference of the diameter of both bores 8 and 9 is no longer adequate for the automatic unlatching and displacement of the ball 11. Also, here the compressive force exerted upon the movable part 1 would be too large, in order that there could even be attained a force component which would move the ball 11 out of the bore 9.

The penetration depth can be identical to the ball stroke or displacement path $h_K$. However, such ball stroke $h_K$, shown in the drawing, can also be greater and, specifically, by the wall thickness s of the tube 2.

The loadability of the ball locking mechanism, i.e., the force which can be exerted thereat, without it unlocking, varies by a factor which is derived from the following relationship:

$$(r^2/2)\,(\pi/180\,\alpha - \sin\alpha)$$

In the above, the symbol $\alpha$ represents the arc angle between oppositely situated contact points 13, 14 of the ball 11 with the edge of the bore 9. This relationship corresponds to the well known equation for the circular segment projected from the ball or sphere, in other words that projection surface 15 lying within the bore 9.

The above mentioned equation for the loadability is, however, only decisive if there is provided in tube 1, instead of the bore 9, a concave recess corresponding to the ball or sphere 11. However, in the case of a cylindrical bore, not shown in the drawing, there are to be taken into account the usually prevailing shearing and deformation properties of the ball and oval tube 1.

Tests have shown that for a given ball diameter the remaining dimensions can have the following percentage values of the ball diameter:

Diameter $d_{Li}$ of the bore 9: 63.0%
Diameter $d_{La}$ of the bore 8: 94.5%
Ball stroke: 11.5%
Wall thickness s of the tube: 21.0%
Diameter of the bore 10: 105.0%
Diameter of the bore 12: 94.5%

These values can be changed, without any disadvantage as concerns proper functioning of the ball locking mechanism.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A ball locking mechanism for the releasable locking of a first movable part at a second stationary part, comprising:
    a first movable part having at least one bore;
    a second stationary part at which there is guided said first movable part;
    said second stationary part having a bore;
    a locking ball movable between a locking position for releasably interlocking the first movable part and the second stationary part with one another and an unlocking position allowing for relative movement of said two parts with respect to one another;
    said locking ball having a part thereof mounted in said bore of the second stationary part and, in the locking position of said locking ball, partially protruding into said bore of said first movable part;
    a slide member provided for and slidably arranged within said second stationary part;
    said slide member being located externally of said first movable part and within said second stationary part, both when said locking ball interlocks said first movable part and second stationary part with one another and when said locking ball is in said unlocking position allowing for relative movement of said two parts with respect to one another;
    said slide member covering at least a portion of said bore of said second stationary part at an end situated opposite said bore of said first movable part;
    said slide member including means into which there can only partially move said ball, during displacement of said slide member, for unlocking the first movable part when a pressure is exerted upon said ball which is effective transversely with respect to the lengthwise axis of the bore of the second stationary part;
    said slide member coacting with said locking ball such that when said first movable part is under load the ball locking mechanism cannot be released;
    said bore of said second stationary part being dimensioned such that at least a portion thereof is smaller than the diameter of said locking ball so that said locking ball cannot move out of said bore of said second stationary part in the direction of said first movable part and so that said first movable part is not unlocked until said means included in said slide member is coaxial with said bore of said second stationary part; and
    said first movable part being completely detachable from said second stationary part without said locking ball moving out of said bore of said second stationary part in the direction of said first movable part.

2. The ball locking mechanism as defined in claim 1, wherein:
    said means of said slide member comprises a bore.

3. The ball locking mechanism as defined in claim 1, wherein:
    said means of said slide member comprises recess means.

4. The ball locking mechanism as defined in claim 1, wherein:
    said locking ball has a displacement stroke between the unlocking position and the locking position defined by said bore of the first movable part; and
    said displacement stroke amounting to at least one-tenth and no more than one-third of the diameter of said locking ball.

5. The ball locking mechanism as defined in claim 1, wherein:
    said first movable part contains a plurality of said ball receiver means spaced from one another in an axial extent of said first movable part in order to be able to selectively lock said first movable part in a desired elevational position with respect to said second stationary part.

6. A ball locking mechanism for the releasable locking of a first movable part at a second part, comprising:
    a first movable part having at least one bore;
    a second part at which there is guided said first movable part;
    said second part having a bore;
    a locking ball movable between a locking position for releasably interlocking the first movable part and the second part with one another and an unlocking position allowing for relative movement of said two parts with respect to one another;
    said locking ball having a part thereof mounted in said bore of the second part and, in the locking position of said locking ball, partially protruding into said bore of said first part;

a slide member provided for and slidably arranged within said second part;

said slide member covering at least a portion of said bore of said second part at an end situated opposite said bore of said first part;

said slide member including means into which there can only partially move said ball, during displacement of said slide member, for unlocking the first part when a pressure is exerted upon said ball which is effective transversely with respect to the lengthwise axis of the bore of the second part;

said slide member coacting with said locking ball such that when said first movable part is under load the ball locking mechanism cannot be released;

said bore of said second part being dimensioned such that at least a portion thereof is smaller than the diameter of said locking ball so that said locking ball cannot move out of said bore of said second part in the direction of said first movable part and so that said first part is not unlocked until said means included in said slide member is coaxial with said bore of said second part;

said first movable part being completely detachable from said second part without said locking ball moving out of said bore of said second part in the direction of said first part;

said first movable part comprises a substantially elliptical portion;

said second part contains a substantially elliptical portion; and said locking ball being located externally of said elliptical portions of said first and second parts when in said unlocking position and in said locking position of said locking ball locking said elliptical portions of said first and second parts from the outside.

7. A ball locking mechanism for the releasable locking of a first movable part at a second stationary part, comprising:

a first movable part having at least one ball receiver means;

a second stationary part at which there is guided said first movable part;

said second stationary part having a bore;

a locking ball movable between a locking position for releasably interlocking the first movable part and the secondary stationary part with one another and an unlocking position allowing for relative movement of said two parts with respect to one another;

said locking ball having a part thereof mounted in said bore of the second stationary part and, in the locking position of said locking ball, partially protruding into said ball receiver means of said first movable part;

a slide member cooperating with and slidably arranged within said second stationary part;

said slide member being located externally of said first movable part and within said second stationary part, both when said locking ball interlocks said first movable part and second stationary part with one another and when said locking ball is in said unlocking position allowing for relative movement of said two parts with respect to one another;

said slide member covering at least a portion of said bore of said second stationary part at an end situated opposite said ball receiver means of said first movable part;

said slide member including means into which there can only partially move said ball, during displacement of said slide member, for unlocking the first movable part when a pressure is exerted upon said ball which is effective transversely with respect to the lengthwise axis of the bore of the second stationary part;

said slide member coacting with said locking ball such that when said first movable part is under load the ball locking mechanism cannot be released;

said bore of said second stationary part being dimensioned such that at least a portion thereof is smaller than the diameter of said locking ball so that said locking ball cannot move out of said bore of said second stationary part in the direction of said first movable part and so that said first movable part is not unlocked until said means included in said slide member is coaxial with said bore of said second stationary part; and said first movable part being completely detachable from said second stationary part without said locking ball moving out of said bore of said second stationary part in the direction of said first movable part.

* * * * *

UNITED STATES PATENT AND TRADEMARK OFFICE
CERTIFICATE OF CORRECTION

PATENT NO. : 4,480,497
DATED : November 6, 1984
INVENTOR(S) : HERMANN LOCHER

It is certified that error appears in the above-identified patent and that said Letters Patent is hereby corrected as shown below:

Column 3, line 30, after "diameter", please insert $--d_{La}--$

Signed and Sealed this

Second Day of April 1985

[SEAL]

Attest:

DONALD J. QUIGG

Attesting Officer

Acting Commissioner of Patents and Trademarks